United States Patent [19]
Carignani et al.

[11] Patent Number: 4,461,850
[45] Date of Patent: Jul. 24, 1984

[54] PROCESS FOR OBTAINING CELLULAR MATERIALS BASED ON UNSATURATED POLYESTER RESINS

[75] Inventors: Giancarlo Carignani, Rome; Aldo Cipriani, Colleferro; Massimo Mazzola, Segni, all of Italy

[73] Assignee: Snia Viscosa Societa' Nazionale Industria Aplicazioni Viscosa SpA, Milan, Italy

[21] Appl. No.: 281,903

[22] Filed: Jul. 9, 1981

[30] Foreign Application Priority Data

Jul. 18, 1980 [IT] Italy ................................ 23540 A/80

[51] Int. Cl.$^3$ ............................................. B29D 27/00
[52] U.S. Cl. ...................................... 521/91; 264/45.3; 264/46.4; 264/50; 264/257; 264/DIG. 18; 521/82; 521/84.1; 521/97; 521/917
[58] Field of Search ..................... 264/45.3, 46.6, 46.4, 264/45.5, 48, 50, 54, 53, 321, 257; 521/917, 91, 82, 84, 97

[56] References Cited

U.S. PATENT DOCUMENTS

| | | | |
|---|---|---|---|
| 2,706,108 | 4/1955 | Miner | 521/917 X |
| 2,904,407 | 9/1959 | Rosenthal | 521/917 X |
| 3,178,490 | 4/1965 | Petrino et al. | 264/48 X |
| 3,182,104 | 5/1965 | Cwik | 264/45.5 X |
| 3,208,958 | 9/1965 | Jennings | 521/917 X |
| 3,608,008 | 9/1971 | Soukup et al. | 264/45.5 |
| 3,802,949 | 4/1974 | Brown et al. | 264/321 X |
| 3,881,871 | 5/1975 | Porter | 521/917 X |
| 3,896,060 | 7/1975 | Plunguian et al. | 264/50 X |
| 3,902,850 | 9/1975 | Lehnert | 521/917 X |
| 3,954,274 | 5/1976 | Grandlic et al. | 264/46.6 X |
| 4,119,583 | 10/1978 | Filip et al. | 264/46.6 X |
| 4,122,047 | 10/1978 | Filip et al. | 521/917 X |
| 4,314,036 | 2/1982 | Throne et al. | 264/46.6 X |

Primary Examiner—Philip E. Anderson
Attorney, Agent, or Firm—Wenderoth, Lind & Ponack

[57] ABSTRACT

Process for obtaining cellular materials, based on unsaturated polyester resin optionally containing reinforcing and/or inert fillers, having a density between 0.2 and 1.0 kg/l by moulding under pressure a liquid foam of said resins, characterized by the fact that the liquid foam based on unsaturated polyester resins containing conventional additives, optionally containing an inert and/or reinforcing charge of mineral or organic fibers having a length which is less than 5 mm, preferably less than 3 mm and more preferably less than 1.5 mm, obtained by mechanical introduction of a gas and/or by means of a chemical and/or physical foaming agent, is firstly introduced into an open half-mould optionally containing a further fiber reinforcement, by casting an amount higher than the free volume of the mould, and subsequently said foam is cross-linked.

11 Claims, 10 Drawing Figures

```
┌─────────────────────────────┐
│     Preformed Liquid        │
│ Polyester Resin Composition │
│   Produced in a Turbine Mixer│
│       by Introduction of    │
│      a Gas with Mixing      │
└─────────────────────────────┘
              ⇓
┌─────────────────────────────┐
│    Introduction of Foam     │
│   Into a Half-Mold in an    │
│     Amount Greater than     │
│       the Free Volume       │
│         of the Mold         │
└─────────────────────────────┘
              ⇓
┌─────────────────────────────┐
│       Closing the Mold      │
│       with Other Half       │
│         of Mold and         │
│   Forming Final Cellular    │
│    Products Under Pressure  │
└─────────────────────────────┘
              ⇓
┌─────────────────────────────┐
│       Cross-Linking the     │
│        Preformed Resin      │
│         Within the Mold     │
└─────────────────────────────┘
```

FIG. 2

MOLDING SCHEME FOR GLASSFIBER-REINFORCED POLYESTER FOAM

1. MONOFILAMENT MAT
2. FOAM
3. MAT + FOAM
4. MOLDED ARTICLE

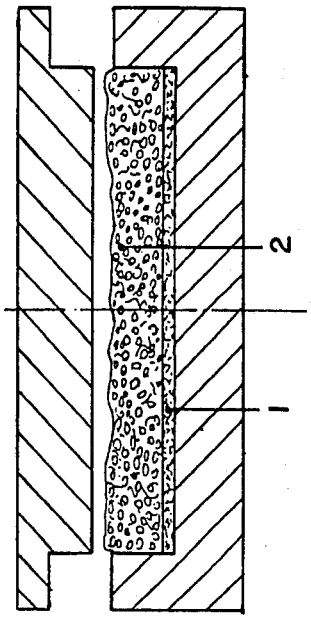
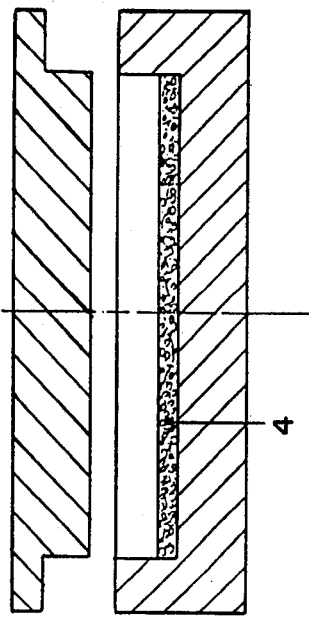
MOLDING SCHEME FOR GLASSFIBER-REINFORCED POLYESTER FOAM
1. MONOFILAMENT MAT
2. FOAM
3. MAT + FOAM
4. MOLDED ARTICLE

PROCESS FOR OBTAINING CELLULAR MATERIALS BASED ON UNSATURATED POLYESTER RESINS

BACKGROUND OF THE INVENTION

Field of the Invention

The present invention relates to a process for obtaining cellular materials based on unsaturated polyester resins optionally reinforced by means of reinforcing fibers, by moulding under pressure a liquid foam based on said resins. More particularly, said moulding process is carried out by firstly casting a preformed foam into a half-mould, optionally containing reinforcing fibers, and subsequently closing the mould by means of the other half-mould in such a way as to create a pressure within the mould.

The present invention also relates to the cellular materials thus obtained, as well as to the products made from said cellular materials.

The Applicant has surprisingly found a method for producing cellular materials, based on unsaturated polyester resins, optionally containing reinforcing and/or inert fillers and having a density between 0.2 and 0.9 kg/l (in the case of the uncharged material) and between 0.4 and 1.0 kg/l (in the case of the charged material).

SUMMARY OF THE INVENTION

An object of the present invention is therefore a process for obtaining cellular materials, based on unsaturated polyester resins optionally containing reinforcing and/or inert fillers, having a density between 0.2 and 1.0 kg/l, by moulding under pressure a liquid foam of said resins, characterized by the fact that a liquid foam based on unsaturated polyester resins containing conventional additives, optionally containing an inert and/or reinforcing charge of mineral or organic fibers having a length which is less than 5 mm, preferably less than 3 mm and more preferably less than 1.5 mm, obtained by mechanical introduction of a gas and/or by means of a chemical and/or foaming agent, is firstly introduced into an open half-mould optionally containing a further fibers reinforcement, by casting it in an amount greater than the free volume of the mould, and subsequently said foam is cross-linked.

The cross-linking within the mould may occur, according to the present invention, both in the hot or in the cold, preferably between 20° C. and 150° C., more preferably between 50° C. and 90° C.

Conveniently, the amount of liquid foam to be cast into the mould should be coordinated to the free volume of the closed mould (minus the volume of the reinforcing filler which may have been previously placed in the mould) and to the moulding pressure which it is desired to obtain, in such a way as to reach a pressure between 2 and 11 ata (absolute atmospheres), taking into account the moulding temperature, the volume ratio of the gas to the liquid phase in the liquid foam, and the density of the additive-containing resin. Thus, for example, when an additive-containing resin having a density 1.1 kg/l is used, from which resin a liquid foam has been obtained having a density of 0.2 kg/l at 20° C. and 1 ata, a cellular material having a density of 0.34 kg/l is obtained by applying a pressure of 2 ata in the mould and a temperature of 20° C., whereas a cellular material having a density of 0.97 kg/l is obtained by applying a pressure of 11 ata and a temperature of 90° C. to a liquid foam of said resin having a density of 0.5 kg/l (at 20° C. and 1 ata).

The casting of the foam and the mould closure speed are suitably chosen in such a way as to promote the impregnation of all the fibers, which may be present, on the part of the foam, as well as the possibly complete discharge of the air present in the mould.

It is actually surprising that by the technology which is the object of the present invention it is possible to obtain cellular materials within which the gas bubbles remain substantially mutually separated, even after moulding under pressure.

The reinforcing fibers which may be contained in the half-mould may be glass fibers, carbon fibers, aromatic polyamide fibers, polyester fibers or acrylic fibers, in the form of roving, cut fibers mat or monofilament mat, woven roving, cloth and the like.

If a cut fiber is used, it is convenient to use a product having a binder which has a low solubility in styrene so as to avoid the washing-off, and consequent displacement of the fibers.

Preferably glass fibers are used as the reinforcing material.

The reinforced cellular material based on unsaturated polyester resins thus obtained is also an object of the present invention. Said cellular material preferably has a percentage of closed cells higher than 80%.

If a mono filament mat is employed as reinforcing agent in the mould, a cellular material is obtained which is uniformly reinforced throughout its thickness, viz. in other words, the fibers are uniformly and homogeneously distributed throughout the body of the product.

If a woven roving, rovings, or cloth are used as reinforcing charge in the mould, a cellular material is obtained which is uniformly reinforced in a stable manner along all its surface.

The percentage of reinforcing material is conveniently maintained at a value not higher than 50% by weight with respect to the unsaturated polyester resin.

If glass fibers are used as reinforcing agent located in the mould, said fibers have a diameter which is less than 16 micron; if other synthetic, artificial, vegetal or mineral fibers, such as e.g. aramidic fibers or carbon fibers, are used as the reinforcing material, said fibers have a count which is less than 20 deniers.

The pressure moulding process which is an object of the present invention may be used for producing any type of cellular material. It is particularly suitable for the production of cellular products having large dimensions and/or a complex shape. The inventive process also permits one to produce cellular materials having a very low thickness (down to a minimum of 1 mm), a thing which is difficult to attain by other processes used heretofore.

BRIEF DESCRIPTION OF THE DRAWINGS

FIG. 2 is a flow diagram depicting the method of the present invention.

FIGS. 4A, 4B, 4C and 4D represent a variation of the molding procedure of 3A, 3B, 3C and 3D above, again using a two-part mold.

DETAILED DESCRIPTION OF THE PREFERRED EMBODIMENTS

Figure 1:
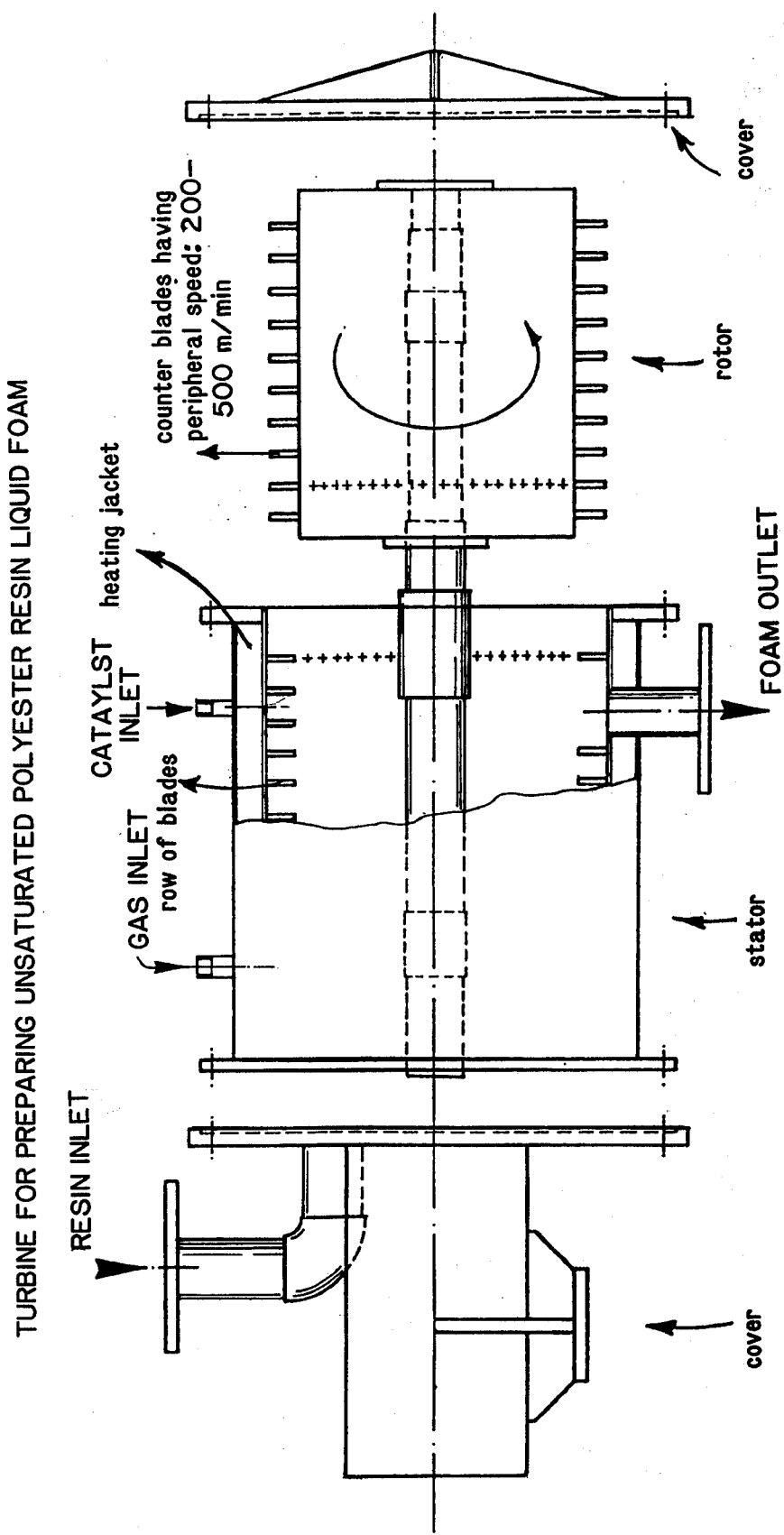
FIG. 1 is an exploded view of the turbine for preparing unsaturated polyester liquid foams according to the present invention.
Figure 3B:
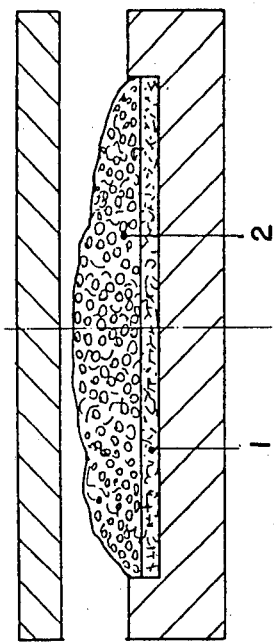
FIGS. 3A, 3B, 3C and 3D represent a molding procedure for producing glass fiber-reinforced polyester mold according to the present invention using a two-part mold.
Figure 3D:
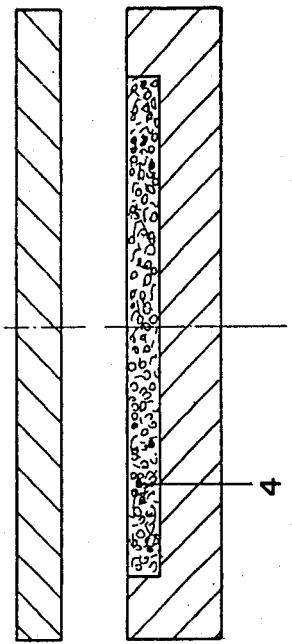
Figure 3A:
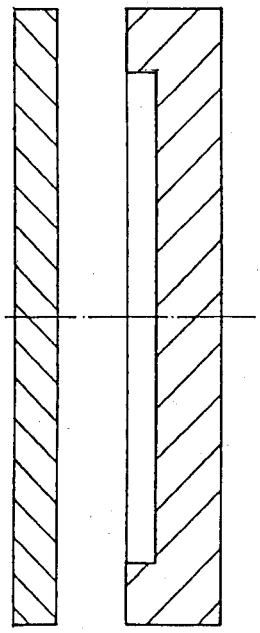
Figure 3C:
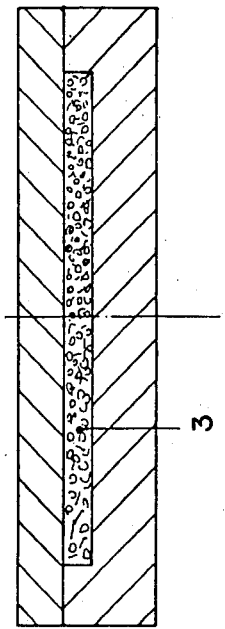

The liquid foam of unsaturated polyester resins, optionally containing the foaming agent and/or the reinforcing material fibers having the aforesaid length, is conveniently obtained in a foaming machine constituted by a turbine mixer having many rows of blades having a peripheral speed of 200/500 m/min, said turbine mixer being heated by means of suitable jackets and each row being separated from the following one by crowns of pegs fixed onto the jacket of the turbine mixer itself (if a chemical and/or physical foaming agent and/or fibers of reinforcing materials hereinbefore specified are used, a stirrer mixer is conveniently inserted upstream of said turbine mixer, in which stirrer mixer the solution of unsaturated polyester resins and of styrene, containing convenient additives, is mixed with said foaming agent and/or the reinforcing material fibers).

A fluid (preferably nitrogen or air) which constitutes the foam generating element is also introduced into said turbine mixer at a suitable pressure. In the last row of the turbine, where the foam has been already created, the catalyst is introduced, so that the foam produced is discharged from the turbine in an already catalyzed condition.

The moulds (constituted by at least two half-shells), into which the liquid foam is cast, may be of metal or of a suitable composite material. A gel coat may also be previously applied onto one of the half-moulds or onto both of them.

If catalystic systems which operate in the hot are used, the moulds may be heated, whereby advantages are obtained in the polymerization time and in the surface finish of the products. If fiber reinforcements are used, the said reinforcing fibers, in a dry condition, are conveniently located within the mould before casting the foam.

The conveniently catalyzed liquid foam, which is introduced into the mould, wets the fibers located therein when it is poured without change in their disposition within the mould, and subsequently polymerized.

Said polymerization reaction may be initiated both in the cold or in the hot depending on the catalytic system employed and on the predetermined purposes. The expression "unsaturated polyester resins" is intended to mean, in connection with the present invention, the resins obtained from an unsaturated polyester formed by poly-condensation of at least one alpha, beta-ethylenically unsaturated dicarboxylic acid and/or least one corresponding anhydride with at least one polyvalent alcohol, and one/or more ethylenically unsaturated monomers, such as for example styrene, vinyltoluene, α-methylstyrene, methylmethacrylate, diallylphthalate, etc.

Examples of ethylenically unsaturated dicarboxylic acid or of corresponding anhydrides comprise maleic acid and its anhydride, fumaric, itaconic, and mesaconic acids.

Together with the unsaturated dicarboxylic acids one may employ saturated aliphatic mono or polyfunctional carboxylic acids such adipic, succinic, glutaric acids and the like; aromatic, mono or polyfunctional carboxylic acids such as phthalic, isophthalic, terephthalic, benzoic acid, etc; anhydrides such as phthalic, tetrahydrophthalic, trimellytic anhydride etc.

As polyvalent alcohols, one may employ ethylene glycol, propylene glycol, 1,2-butanediol, 1,4-cycloexanedimethanol, trimethylolpropane, pentaerythrite, glycerin, neopentyl glycol etc.

The unsaturated polyester resins may be prepared by the known processes employed for polyester resins both in the solvent phase and in the dry phase.

According to a practical and preferred embodiment of the present invention, the unsaturated polyester resin, is obtained by reacting from 1 to 1.3 mole of at least one polyvalent alcohol with from 0.05 to 1 mole of at least one ethylenically unsaturated dicarboxylic acid or an anhydride. The polycondensation is continued until a polymer is obtained which has an acid number comprised between 5 and 90 mg KOH/g. The preferred acid number is comprised between 10 and 30 mg of KOH/g and the molecular weight between 500 and 5000.

Besides the ethylenically unsaturated dicarboxylic acid or a corresponding anhydride, a saturated dicarboxylic acid may be present in a molar amount comprised between 5 and 95%, with respect to the unsaturated dicarboxylic acid, according to the known art.

The unsaturated polyester thus obtained is mixed with styrene, in a polyester/styrene ratio comprises between 9:1 and 1:1, preferably between 4:1 and 2.5:1.

The inhibitors and stabilizers adapted to prevent the premature cross-linking of the styrene/unsaturated polyester mixture may be added to said mixture in an amount from 0.1 ppm to 10000 ppm.

The more useful inhibitors and stabilizers are: hydroquinone, quinone, quinidrone, t.-butylpyrocatechol, toluenehydroquinone, mono-ter.butylhydroquinone, di-ter.butylhydroquinone, 1,4-naphthoquinone, anthraquinone, methyl and/or ethyl ethers of hydroquinone, picric acid, trinitro-benzene, p.-phenyldiamine, etc.

Further, for the purpose of improving the stability of the resin, organic or inorganic compounds soluble in the polyester, quaternary ammonium salts, etc. may be added.

Additives are added to the unsaturated polyester resin prior to foaming for the purposes of improving the stability of foam, such as for example surface active agents for improving the formation of the foam and/or agents for regulating the diameter of the gas bubbles and/or foam stabilizing agents, e.g. surface active agents based on silicon compounds, bloc copolymers of silicons with polyethers, soaps such as ricinoleates, polymercaptanes, etc.

Any compounds or compound mixtures which generate free radicals under the specific polymerization conditions may be used as catalytic system.

Said pompounds are peroxide or hydroperoxide such as diacetyl peroxyde, benzoylperoxide, hydrogen peroxide, cumene hydroperoxide, methylethylketone peroxide etc. Other catalyst which generate free radicals may also be used, such as e.g. ammonium persulphate, perborates and percarbonates.

It is preferred to employ in addition to the free radical generating catalyst, also an accelerator which increases the speed of the decomposition of the peroxide compound, which thus produces free radicals at higher speed. As an accelerator, cobalt naphthenate is generally used, which is diluted with styrene until it is brought to a concentration of about 1–3% of metal.

A complexing agent for increasing the efficiency of the accelerator may also be used. According to a widely accepted interpretation, it is believed that said agent acts to reduce the cobalt naphthenate which is transformed into the corresponding cobaltous compound, which is much more reactive.

Generally aromatic tertiary amines, and among them preferably dimethylaniline, are employed as complexing agents.

Wide variations and modifications may be made in the details of the embodiments of the present invention, without exceeding the spirit and the scope of the invention.

In order better to illustrate the inventive idea of the present invention and to show how it is carried in to practice, a number of nonlimitative examples is described hereinafter.

EXAMPLE 1

100 kg of polyester resin are charged into a steel vessel, which resin has been prepared in a conventional manner in a reactor by reacting the following compounds according to the following molar ratios: propylene glycol 0.8 mole, diethylene glycol 0.2 moles, maleic anhydride 0.6 moles, phthalic anhydride 0.4 moles, hydroquinone 100 ppm, styrene 30% of the total.

500 ml of 6% cobalt octoate solution in xylene, 1 kg of silicon oil, 5 kg of milled glass fibers having a nominal length of 1 mm are added to the aforesaid resin.

The whole is mixed by means of an helical stirrer for 20 minutes. Said mixture is transferred from the vessel by means of the pump, at a flow rate of 200 l/h into a turbine mixer which is thermostated at 35° C. The said turbine mixer is constituted by a stator and rotor provided with projections having a circular cross section. The peripheral speed of the rotor is 250 m/min. The foam generating gas (air) is injected into the turbine mixer from a nozzle. The methylethylketone peroxide catalyst is injected at a flow rate of 1.6 l/h into said turbine mixer before the discharge of foam.

The liquid foam thus formed, which has a density of 0.45 kg/l is poured into an open steel mould heated to 70° C., wherein the glass reinforcement in the form of a monofilament mat layer having a weight of 900 g/m$^2$ has been previously disposed. The mould is closed after disposing a spacing element therein so as to obtain a thickness of 5 mm on the finished product. The time required for cross-linking (5 minutes) is allowed to pass, whereafter the mould is opened again and the cellular product thus obtained is removed therefrom.

The physical-mechanical characteristic are measured on suitable samples of the cellular product according to the ASTM norms, and the following characteristics are found:

| | |
|---|---|
| Density | 0.52 kg/l |
| Tensile strength | 270 kg/cm$^2$ |
| Tensile modulus | 18300 kg/cm$^2$ |
| Elongation at break | 1.68% |
| Compression strength | 181 kg/cm$^2$ |
| Compression modulus | 9700 kg/cm$^2$ |
| Shear resistance | 100 kg/cm$^2$ |
| Shear modulus | 2300 kg/cm$^2$ |
| Flexural strength | 376 kg/cm$^2$ |
| Flexural modulus | 13000 kg/cm$^2$ |
| Thermal conductivity | kcal/h/m/°C. |

EXAMPLE 2

The operations of example 1 are repeated with the only difference being that the catalytic system for hardening and the hardening temperature is modified in the following way: 0.1% by weight of N,N-dimethylaniline is added to the unsaturated polyester resin besides the same amount of cobalt octoate as that used in example 1. 200 l/h of polyester resin are fed into the turbine mixer in which the mechanical foaming occurs. Methylethylketone peroxide in injected with a flow rate of 2.4 l/h and at the turbine discharge outlet the additive-containing foam thus obtained is poured into the same mould as in example 1 and the product is hardened at 30° C. for 10 minutes. The cellular product removed from the mould has a density of 0.55 kg/l.

We claim:

1. In a process for obtaining cellular materials comprising unsaturated polyester resins, optionally containing reinforcing fibers, and having a density between 0.2 and 1.0 kg/l, by molding a pre-formed liquid foam in a mold made of two half-molds cooperating to close together to mold the pre-formed foam, said pre-formed liquid foam being obtained upstream of said molding by mechanical introduction of gas by means of a turbine mixer into said unsaturated polyester resins optionally containing said reinforcing fibers with lengths less than 3 mm, the improvement wherein said pre-formed liquid foam is introduced into an open half-mold of said mold, optionally containing further reinforcing fibers, in an amount having a volume greater than the free volume of the mold when closed, the volume of the liquid foam being selected so as to achieve upon subsequent closure of the mold a pressure therein between 2 and 11 absolute atmospheres, then closing the mold by the other said half-mold so as to create said pressure within the mold, and subsequently crosslinking the resin within the mold under said pressure conditions.

2. In a process for obtaining cellular materials comprising unsaturated polyester resins containing reinforcing fibers and having a density between 0.2 and 1.0 kg/l, by molding a pre-formed liquid foam in a mold made of two half-molds cooperating to close together to mold the pre-formed foam, said pre-formed liquid foam being obtained upstream of said molding by mechanical introduction of gas by means of a turbine mixer into said unsaturated polyester resins containing part of said reinforcing fibers having lengths less than 3 mm, the improvement wherein said pre-formed liquid foam is introduced into an open half-mold of said mold containing the remaining part of said reinforcing fibers, in an amount such that the foam has a volume greater than the free volume of the mold when closed, the volume of the liquid foam being selected so as to achieve, upon subsequent closure of the mold, a pressure between 2 and 11 absolute atmospheres, closing the mold by the other said half-mold so as to create said pressure within the mold and crosslinking the foam within the mold under said pressure.

3. A process according to claims 1 or 2 wherein the cross-linking in the mold takes place at a temperature between 20° C. and 150° C.

4. A process according to claims 1 or 2 wherein the cellular material, having a density of 0.34 kg/l, is obtained by applying a pressure of 2 ata in the mold to a pre-formed liquid foam having a density of 0.2 kg/l, as measured at a temperature of 20° C. and 1 ata, said mold being maintained at a temperature of 20° C. during the molding, said pre-formed liquid foam being previously produced by foaming a cellular resin having a density of 1.1 kg/l.

5. A process according to claims 1 or 2 wherein a cellular material having a density of 0.97 kg/l is obtained by applying a pressure of 11 ata in the mold, heated at a temperature of 90° C., to a pre-formed liquid foam having a density of 0.5 kg/l, as measured at 20° C. and 1 ata, said pre-formed liquid foam being previously produced by foaming a cellular resin having a density of 1.1 kg/l.

6. A process according to claims 1 or 2 wherein said pre-formed liquid foam contains additives selected from the group consisting of inhibitors to prevent premature cross-linking of the resins, accelerators, silicone surfactants and mixtures thereof.

7. A process according to claim 1, wherein said unsaturated polyester resin contains a reinforcing amount up to 50% by weight of said reinforcing fibers.

8. A process according to claim 7 wherein said reinforcing fibers comprise glass fibers having a diameter less than 16 microns.

9. Cellular material comprising unsaturated polyester resins, produced by the process according to claim 1.

10. Reinforced cellular material comprising unsaturated polyester resins produced according to claim 9, wherein said reinforced cellular material has a percentage of closed cells higher than 80%.

11. Cellular materials having a minimum thickness of about 1 mm, obtained by the process according to claim 1.

* * * * *